Figure 1:
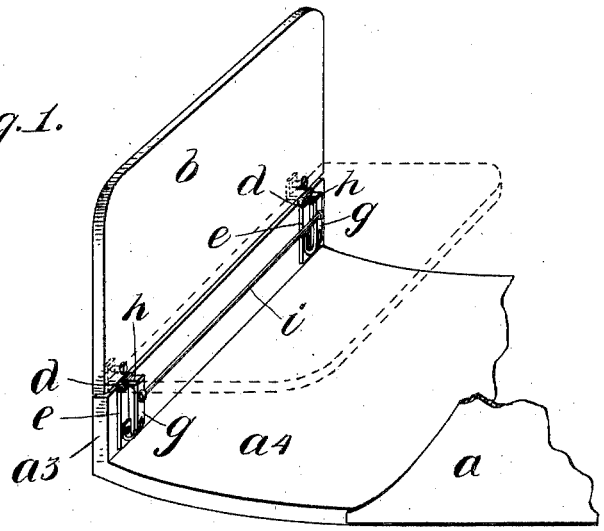

No. 760,346. PATENTED MAY 17, 1904.
J. H. PECAN.
VEHICLE DASHBOARD.
APPLICATION FILED JULY 16, 1903.
NO MODEL.

WITNESSES
F. A. Stewart
C. E. Mulvany

INVENTOR
James H. Pecan
BY Edgar Tate & Co
ATTORNEYS

No. 760,346. Patented May 17, 1904.

UNITED STATES PATENT OFFICE.

JAMES HENRY PECAN, OF ROSLYN, NEW YORK.

VEHICLE-DASHBOARD.

SPECIFICATION forming part of Letters Patent No. 760,346, dated May 17, 1904.

Application filed July 16, 1903. Serial No. 165,773. (No model.)

*To all whom it may concern:*

Be it known that I, JAMES HENRY PECAN, a citizen of the United States, residing at Roslyn, in the county of Nassau and State of New York, have invented certain new and useful Improvements in Dashboards for Buggies and other Light Vehicles, of which the following is a specification, such as will enable those skilled in the art to which it appertains to make and use the same.

The object of this invention is to provide a dashboard for buggies and other light vehicles, which is adapted to be folded backwardly, so that the shafts of the vehicle may also be raised and folded backwardly and be supported by resting against the front end of the body of the vehicle; and with this and other objects in view the invention consists in a folding dashboard for vehicles of the class specified.

The invention is fully disclosed in the following specification, of which the accompanying drawings form a part, in which the separate parts of my improvement are designated by suitable reference characters in both views, and in which—

Figure 2:
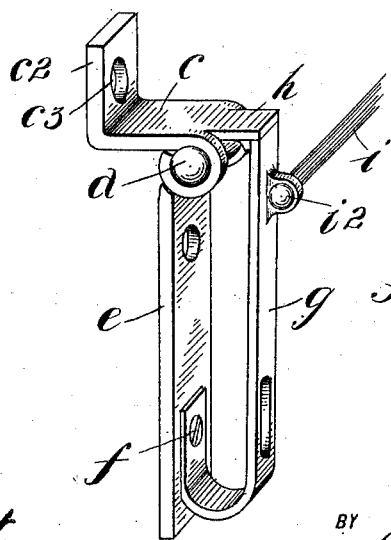

Figure 1 is a perspective view of the front end portion of the body of a buggy or other light vehicle provided with my improved dashboard, and Fig. 2 a similar view of the means which I employ for holding the dashboard in position.

In the drawings forming part of this specification I have shown at $a$ the front end portion of a buggy or other light vehicle, which is provided with a front board or end piece $a^2$, which in the form of construction shown is secured to or connected with the bottom portion $a^4$ of the body of the vehicle on which in practice the feet rest; but it will be apparent that the part $a^3$ may constitute the front end of a bed or box-shaped body portion, if desired.

The dashboard is shown at $b$ and is connected with part $a^3$ by two pieces of angle-iron $c$, having an upright member $c^2$, to which the dashboard $b$ is secured by means of screws or bolts, as shown at $c^3$. The angle-irons $c$ are hinged, as shown at $d$, to plates $e$, which are secured in an upright position to the part $a^3$, and near the opposite ends thereof and secured to the lower ends of the plates $e$, as shown at $f$, are spring members $g$, which extend upwardly parallel with the plates $e$, and the angle-irons $c$, which form parts of the hinges by which the dashboard $b$ is held, are provided with backwardly-directed projections $h$, which normally rest on the upper ends of the spring members $g$. The spring members $g$ also form a support for the toe-rod $i$, which is connected therewith, as shown at $i^2$, and in the normal position of the parts the dashboard $b$ is rigidly held in an upright position, as shown in full lines in Fig. 1, and whenever it is desired to fold the dashboard backwardly the spring members $g$ are pulled backwardly, so as to release the backwardly-directed projections $h$ of the hinge members $c$, at which time the dashboard $b$ may be folded backwardly, as shown in dotted lines in Fig. 1, and said dashboard may be raised into an upright position whenever desired, the springs $g$ moving forward automatically and again serving as supports for the hinge members $c$. The spring members $g$ may be pulled backwardly, so as to allow the dashboard to be folded backwardly by hand or by placing the toes back of the toe-rod $i$. My invention, however, is not limited to the exact construction herein shown and described, as it will be apparent that various forms of devices may be provided for holding the dashboard in an upright position, and I reserve the right to make all such alterations in and modifications of the construction herein described as fairly come within the scope of the invention.

Having fully described my invention, what I claim as new, and desire to secure by Letters Patent, is—

The herein-described means for securing a dashboard to the front end portion of the body of a vehicle comprising two hinges consisting of plates adapted to be secured to the body of the vehicle, and angle-irons adapted to be secured to the dashboard, said angle-irons being provided with backwardly-directed projections and said plates with springs which operate in connection with said projections to hold the dashboard in an upright position, the said spring being also connected by a transverse rod, substantially as shown and described.

In testimony that I claim the foregoing as my invention I have signed my name, in presence of the subscribing witnesses, this 11th day of July, 1903.

JAMES HENRY PECAN.

Witnesses:
SAMUEL HOOPER,
SAMUEL R. ELY.